[11] 3,736,048
[45] May 29, 1973

[54] OPTICAL OBJECTIVES OF VARIABLE EQUIVALENT FOCAL LENGTH

[75] Inventors: Gordon Henry Cook, Oadby, England; Peter Arnold Merigold, Prestatyn, Wales

[73] Assignee: The Rank Organization Limited, London, England

[22] Filed: June 11, 1971

[21] Appl. No.: 152,254

Related U.S. Application Data

[63] Continuation-in-part of Ser. No. 309,208, Sept. 16, 1963, abandoned.

[52] U.S. Cl. ................. 350/186, 350/187, 350/214
[51] Int. Cl. .................. G02b 7/10, G02b 15/18
[58] Field of Search ........................... 350/184, 186

[56] References Cited

UNITED STATES PATENTS

| | | | |
|---|---|---|---|
| 3,027,805 | 4/1962 | Yamaji | 350/184 |
| 3,038,378 | 6/1962 | Harris et al. | 350/186 X |
| 3,057,257 | 10/1962 | Klemt et al. | 350/184 |

*Primary Examiner*—John K. Corbin
*Attorney*—Holcombe, Wetherill & Brisebois

[57] ABSTRACT

A zoom lens having an improved zooming range and comprising a convergent first member which for a given object distance remains stationary during the zooming relative movements, an axially movable divergent second member behind the first member having equivalent focal length $f_b$ lying numerically between 4 and 8 times the minimum value of the ratio of the equivalent focal length of the complete objective to the $f$-number of the objective in the range of variation, an axially movable divergent third member behind the second member having equivalent focal length $f_c$ lying numerically between 5 and 10 times the minimum value of such ratio, a stationary convergent fourth member behind the third member, a zoom control element, and means whereby operation of the zoom control element causes the zooming relative movements to be effected, wherein the total axial movement of the second member in the range of variation lies numerically between $1.5f_B$ and $2.5f_B$ and the total axial movement of the third member in the range lies numerically between $0.25f_c$ and $0.5f_c$, the minimum axial separation between the second and third members occurring when the equivalent focal length of the object is greater than half its maximum value in the range of variation, the movable divergent second member consisting of a divergent simple meniscus component with its surfaces convex to the front and a divergent compound component behind such simple component, and the movable divergent third member consisting of a doublet component having its front surface concave to the front with radius of curvature lying numerically between $0.5f_c$ and $1.0f_c$.

22 Claims, 7 Drawing Figures

Inventor
P. A. Merigold
By G. H. Cook
Attorneys

OPTICAL OBJECTIVES OF VARIABLE EQUIVALENT FOCAL LENGTH

This application is a continuation-in-part of our prior application Ser. No. 309,208, filed Sept. 16, 1963, now abandoned.

This invention relates to an optical objective of the "zoom" type, that is of the type having relatively movable members whereby under the control of a zoom control element the equivalent focal length of the objective can be continuously varied throughout a range, whilst maintaining constant position of the image plane, whereby the scale of the image can be varied, the objective being corrected for spherical and chromatic aberration, coma, astigmatism, field curvature and distortion. In this type of objective, accommodation for change of object position is usually achieved by imparting a movement, independent of the zooming relative movements, to the front member of the objective.

Many difficulties arise in the design of such objectives, and one of the problems facing designers of today is to achieve an increased range of variation of equivalent focal length and, where possible, also an increased angular field of view. Attempts to achieve this have usually involved the use of relatively complicated movable members in the objective in order to make it possible to stabilize the aberrations throughout the range of variation, such stabilized aberrations then being compensated in a stationary rear member of the objective which also serves to locate the resultant image plane in a convenient position. This in turn involves the use of relatively large and heavy movable members and not only increases the bulk and size of the complete objective, but also presents severe mechanical problems in controlling the movements, especially bearing in mind that at least one of the movable members must necessarily perform a movement bearing a non-linear relationship to the movement of the zoom control element. Many attempts to extend the range of variation of the equivalent focal length have failed, because they have demanded departures from linearity of movement which are impracticable mechanically, and often too because they have involved an increase in the bulk and size of the objective to unmanageable proportions or have introduced too severe optical difficulties in achieving aberration correction.

One way of reducing the mechanical complexities is so to arrange the system that the front member does not participate in the zooming movements for varying the equivalent focal length, so that this member is concerned only with focussing movements and is relieved of the complication of superimposing focussing movements on zooming movements. Such an arrangement is utilized in the present invention, wherein the primary object is to provide an improved arrangement of the movable zooming system of the objective, which can be employed with various different arrangements of the front member and will cooperate therewith to enable aberration stability to be achieved throughout a widely extended range of variation of the equivalent focal length of the objective.

BRIEF SUMMARY OF THE INVENTION

The optical objective of the zoom type according to the present invention has four members of which the first (counting from the front) for a given object distance remains stationary during the zooming relative movements, the second and third are divergent and movable, and the fourth is convergent and stationary, the minimum separation between the second and third members occurring when the equivalent focal length of the objective is greater than half its maximum value in the range of variation, whilst the equivalent focal lengths $f_B$ and $f_C$ respectively of the movable second and third members lie numerically respectively between 4 and 8 times the minimum value of the ratio of the equivalent focal length of the objective to the f-number of the objective in the range of variation and between 5 and 10 times such minimum ratio, the divergent movable second member consisting of a divergent simple meniscus component with its surfaces convex to the front followed by a divergent compound component and performing during the range of variation a total axial movement lying numerically between $1.5f_B$ and $2.5 f_B$, whilst the divergent movable third member consists of a doublet component having a front surface concave to the front with radius of curvature lying numerically between $0.5f_C$ and $1.0f_C$ and performs during the range of variation a total axial movement lying numerically between $0.25f_C$ and $0.5f_C$.

Several specific examples of optical objectives as above described will be given later on in this specification, and a table will be found after the first example, together with an accompanying explanation showing the effect of varying those parameters for which ranges of variation are given in the preceding paragraph within the ranges specified in that paragraph.

It is to be understood that the terms "front" and "rear", as used herein, relate respectively to the sides of the objective nearer to and further from the longer conjugate in accordance with the usual convention.

In addition, the term "total axial movement" is used to refer to the total distance moved by a member during zooming from one end of the range to the other, independently of the direction of movement. Thus, a member may move forward and then back during the range of variation, and in this case the total axial movement is the numerical sum of the forward distance moved plus the rearward distance moved.

It should also be made clear that the term "internal contact", when used in connection with a compound component, is intended to include, not only a cemented contact, but also what is commonly known as a "broken contact", that is one in which the two contacting surfaces have slightly different radii of curvature, the effective radius of curvature of such a broken contact being the arithmetic mean between the radii of curvature of the individual contacting surfaces, whilst the optical power of the broken contact is the harmonic mean between the optical powers of the individual contacting surfaces.

The characteristics of the movable second and third members above specified contribute towards keeping the overall dimensions of the objective as small as possible and achieving the best compromise between the diameters and the relative apertures of the individual members of the objective, and also permit the front nodal points of the second and third members to be located as far forward as possible, thus making it possible, not only to accommodate the desired movements of the members without risk of fouling between the members and with minimum increase in the overall length of the objective, but also to achieve a good compromise between the diameters and relative apertures of the individual members, and at the same time to assist towards the desired stabilization of the aberrations, especially of spherical aberration and coma, throughout a widely extended range of variation of the equivalent focal length of the objective.

FURTHER FEATURES OF THE INVENTION

The compound component in the divergent movable second member preferably includes at least one convergent element and at least one divergent element made of materials whose Abbe V numbers differ from one another by more than 25, thus permitting such second member to be individually corrected for chromatic aberration.

For assisting towards stabilization of astigmatism and distortion, the radius of curvature of the front surface of the simple meniscus component of the second member preferably lies numerically between $1.5f_B$ and $3f_B$, and further assistance towards stabilization of astigmatism can be obtained by arranging for the radius of curvature of the rear surface of such component to lie numerically between $0.66f_B$ and $1.0B$. B.

The front surface of the compound component of the second member is preferably concave to the front with radius of curvature lying numerically between $1.5f_B$ and $3f_B$, the rear surface of such component being convex to the front with radius of curvature lying numerically between $3f_B$ and $6f_B$, thus assisting towards stabilization of spherical aberration and coma.

Whilst such compound component may consist of a doublet component, it will usually be preferable for it to be in the form of a triplet component having a convergent element between two divergent elements. This, in view of the limited availability of suitable materials for the various elements, facilitates correction of chromatic aberration and the desired stabilization of the other aberrations without excessive curvature of the individual surfaces.

The avoidance of excessive surface curvatures can also be assisted by employing for all the elements of the second member materials whose mean refractive indices are greater than 1.65, whilst the mean refractive indices of the materials of the elements of the compound component in such member do not differ from one another by more than 0.15. The arithmetic mean between the Abbe V numbers of the materials of the divergent elements in the second member preferably exceeds that of the convergent element or elements by at least 25, in order to assist in correcting such member for chromatic aberration.

The doublet component constituting the divergent movable third member preferably has a collective internal contact convex to the front with radius of curvature lying numerically between $0.5f_C$ and $f_C$, the difference between the mean refractive indices of the materials of the two elements of such component lying between 0.05 and 0.15, whilst the difference between the Abbe V numbers of such materials exceeds 25. These features contribute towards the desired stabilization of the spherical aberration and coma and also facilitate individual correction of the third member for chromatic aberration.

As in the case of the second member, it is preferable to employ materials for the elements of the third member having mean refractive indices greater than 1.65, in order to avoid excessive surface curvatures and thus facilitate the attainment of a wide relative aperture for the member.

A movable system arranged in the manner above described in accordance with the present invention is suitable for use with various different arrangements of the first member of the objective, but it is especially advantageous for such member to have one or more of the following characteristics:

A. The first member is preferably convergent and may comprise a front meniscus doublet component with its front and rear surfaces concave to the front followed by two simple convergent components, the front surface of the doublet component having dispersive optical power lying numerically between $0.5/f_A$ and $1.0/f_A$, where $f_A$ is the equivalent focal length of the first member. These features permit the rear nodal point of the first member to be far to the rear and preferably behind the rear surface of the member, for cooperation with the forwardly located front nodal point of the second member.

B. The internal contact of the meniscus doublet component of the first member may be dispersive and convex to the front with radius of curvature between $1.5f_A$ and $3f_A$, the difference between the mean refractive indices of the materials of the two elements of such doublet component being greater than 0.15. These features contribute towards stabilization of spherical aberration and astigmatism over the desired focussing range to suit different object distances.

C. The two simple components of the first member may together have a combined equivalent focal length between $0.75f_A$ and $1.25f_A$, their front surfaces each being convex to the front, the radius of curvature of the front surface of the first of such simple components being less than $4f_A$ and greater than twice the radius of curvature of the front surface of the second of such simple components, which latter radius of curvature may in turn be greater than $0.75f_A$. These features assist towards stabilizing the aberrations, especially spherical aberration and astigmatism, not only throughout the range of focussing adjustments, but also throughout the range of variation of equivalent focal length.

D. The rear surface of the rear component of the first member may be convex to the front with radius of curvature between $2f_A$ and $7f_A$. This feature contributes towards stabilization of primary astigmatism throughout the range of focussing adjustments, and also of primary and higher order astigmatism throughout the range of variation of equivalent focal length.

E. The axial thickness of the meniscus doublet component of the first member may be less than $0.25f_A$ and greater than the sum of the axial thicknesses of the two simple components thereof, such sum in turn being greater than $0.075f_A$. These features contribute towards the desired rearward location of the rear nodal point of the first member.

F. The arithmetic mean between the Abbe V numbers of the material of the three convergent elements of the first member may exceed by at least 20 the Abbe V number of the material of the divergent front element of the meniscus doublet component of such member, thus facilitating individual correction of the first member for chromatic aberration.

G. The equivalent focal length $f_A$ of the first member may lie between 1.2 and 2.4 times the maximum value of the ratio of the equivalent focal length of the objective to the $f$-number of the objective. This feature assists towards keeping the overall dimensions of the objective and also the relative aperture of the first member as small as possible.

H. If desired, an achromatic doublet component may be provided, which can be placed at will behind the rear member of the objective to increase the value of the equivalent focal length of the objective by a chosen ratio throughout the range of variation.

In all the arrangements according to the present invention, it is preferable for the iris diaphragm of the objective to be stationary and to be located behind the movable third member of the objective.

DESCRIPTION OF EMBODIMENTS

Figure 1:
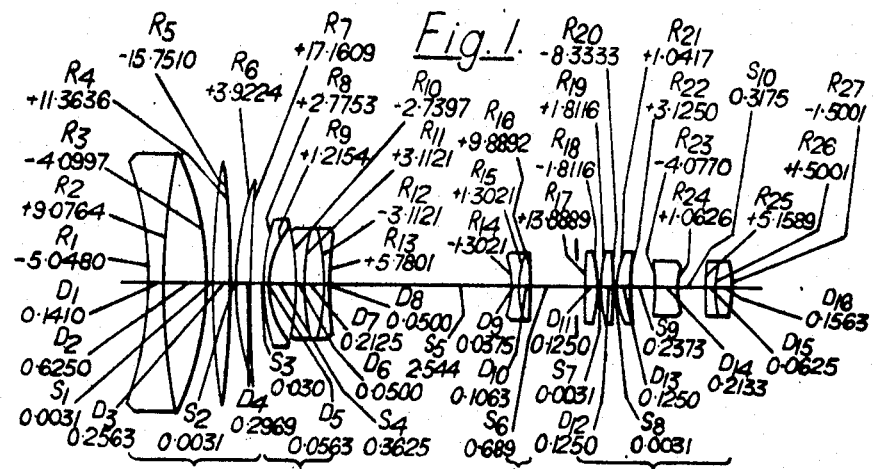
Figure 2:
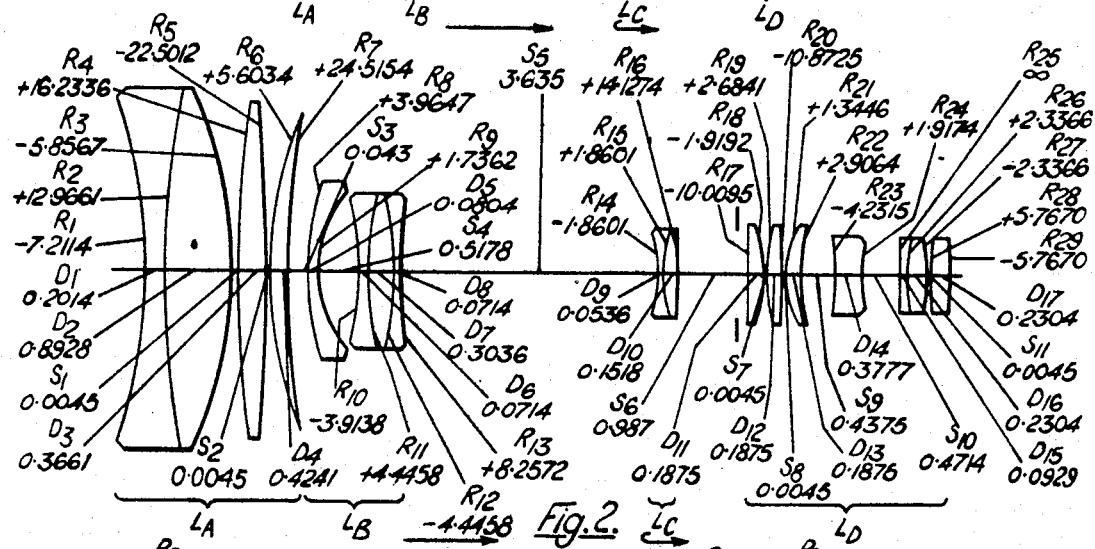
Figure 3:
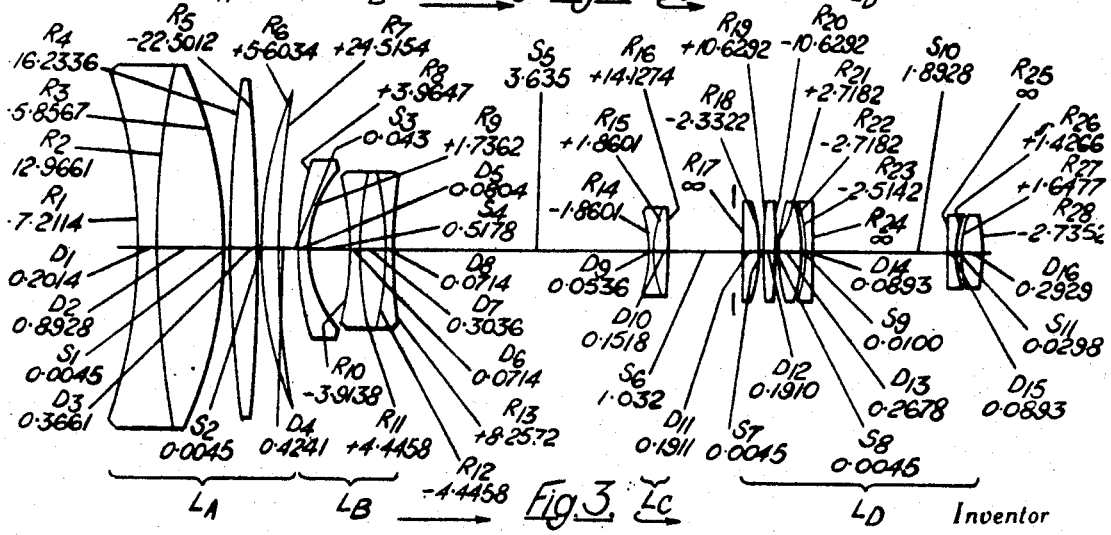
Figure 4:
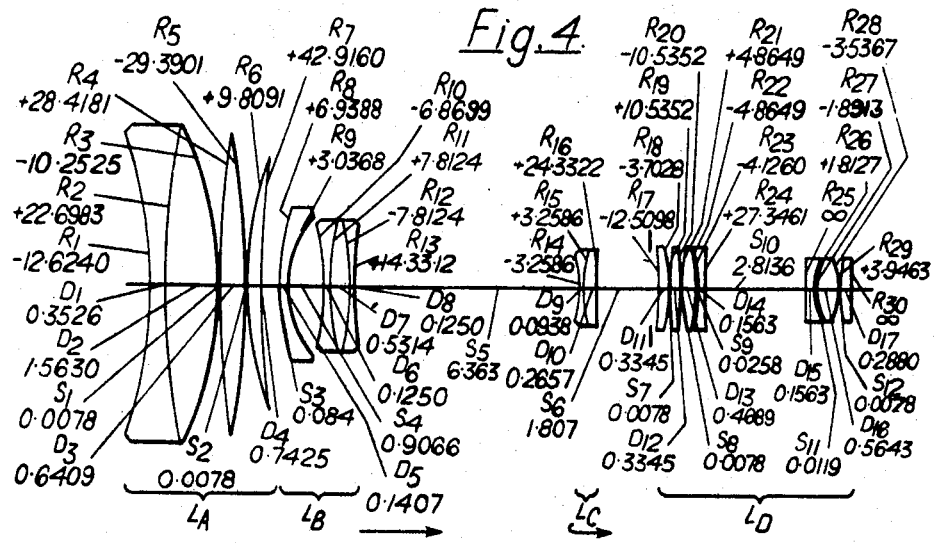
Figure 5:
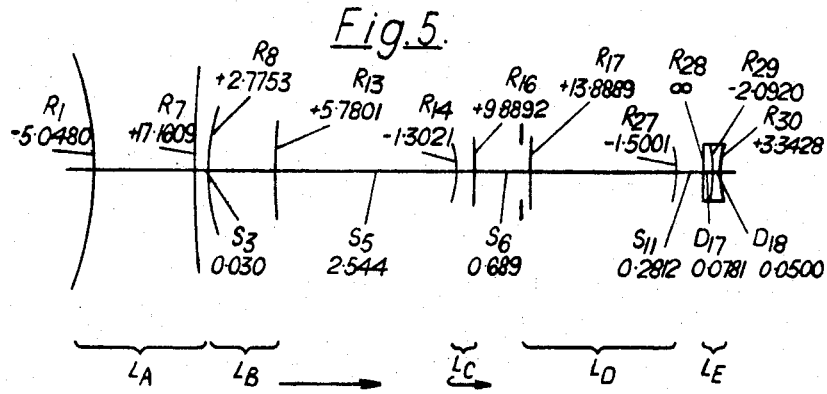
Figure 6:
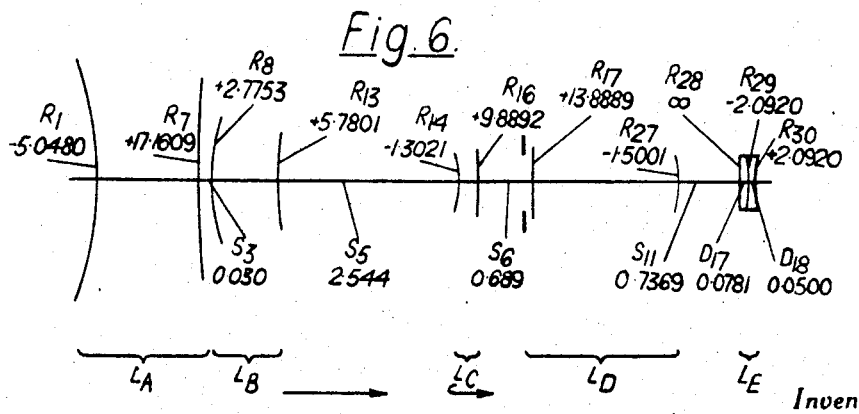
Figure 7:
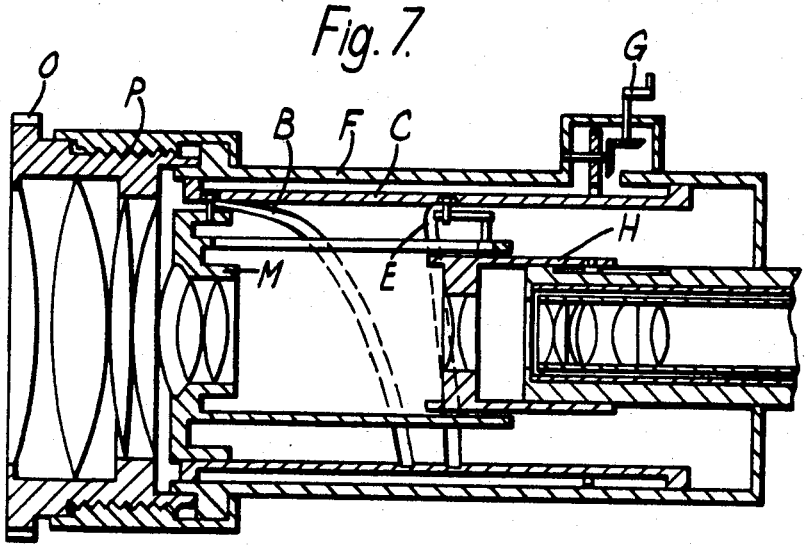

Some convenient practical examples of zoom objective according to the invention are illustrated diagrammatically in the accompanying drawings, in which FIGS. 1 – 4 respectively illustrate four examples (FIG. 4 being on half the scale of FIGS. 1 – 3), FIGS. 5 – 6 show the example of FIG. 1 (in skeleton form) modified by the addition respectively of two alternative constructions of achromatic doublet component detachably mounted behind the rear member of the objective, and FIG. 7 is an axial section through a lens mount having suitable zoom control element for use in carrying out the invention.

Numerical data for these six examples are given in the following tables (numbered correspondingly to the figures of the drawings), in which $R_1$, $R_2$ . . . designate the radii of curvature of the individual surfaces of the objective counting from the front, the positive sign indicating that the surface is convex to the front and the negative sign that it is concave thereto, $D_1$, $D_2$ . . . designate the axial thicknesses of the individual elements of the objective, and $S_1$, $S_2$ . . . designate the axial air separations between the components of the objective. The tables also give the mean refractive indices $n_d$ for the $d$-line of the spectrum and the Abbe V numbers of the materials from which the various elements of the objective are made, and in addition the clear diameters of the various surfaces of the objective.

The second section of each table gives the values of the three variable axial air separations between the four members of the objective for a number of representative positions, for which the corresponding values of the equivalent focal length F of the complete objective from its minimum value $F_o$ to its maximum value $F_m$ are also given, together with the corresponding values of log F.

Some of the tables also have a third section giving the equation defining an axial section through an aspheric surface provided in the stationary rear member of the objective, the radius of curvature given for such surface in the first section of the table being the radius of curvature at the vertex of the surface.

The dimensions in each table are given in terms of $F_o$.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

EXAMPLE I

| Radius | Thickness or air separation | Refractive index $n_d$ | Abbe V number | Clear diameter |
|---|---|---|---|---|
| $R_1 = -5.0480$ | $D_1 = 0.1410$ | 1.7847 | 26.10 | $R_1$ 3.4435 |
| $R_2 = +9.0764$ | $D_2 = 0.6250$ | 1.51507 | 56.35 | $R_2$ 3.4750 |
| $R_3 = -4.0997$ | $S_1 = 0.0031$ | | | $R_3$ 3.4870 |
| $R_4 = +11.3636$ | $D_3 = 0.2563$ | 1.717 | 47.90 | $R_4$ 3.3715 |
| $R_5 = -15.7510$ | $S_2 = 0.0031$ | | | $R_5$ 3.3610 |
| $R_6 = +3.9224$ | $D_4 = 0.2969$ | 1.717 | 47.90 | $R_6$ 3.1035 |
| $R_7 = +17.1609$ | $S_3 = $ Variable | | | $R_7$ 3.0707 |
| $R_8 = +2.7753$ | $D_5 = 0.0563$ | 1.69734 | 56.19 | $R_8$ 1.7000 |
| $R_9 = +1.2154$ | $S_4 = 0.3625$ | | | $R_9$ 1.4812 |
| $R_{10} = -2.7397$ | $D_6 = 0.0500$ | 1.69734 | 56.19 | $R_{10}$ 1.4712 |
| $R_{11} = +3.1121$ | $D_7 = 0.2125$ | 1.7847 | 26.10 | $R_{11}$ 1.4092 |
| $R_{12} = -3.1121$ | $D_8 = 0.0500$ | 1.69734 | 56.19 | $R_{12}$ 1.3947 |
| $R_{13} = +5.7801$ | $S_5 = $ Variable | | | $R_{13}$ 1.3412 |
| $R_{14} = -1.3021$ | $D_9 = 0.0375$ | 1.69734 | 56.19 | $R_{14}$ 0.7807 |
| $R_{15} = +1.3021$ | $D_{10} = 0.1063$ | 1.7847 | 26.10 | $R_{15}$ 0.8205 |
| $R_{16} = +9.8892$ | $S_6 = $ Variable | | | $R_{16}$ 0.8300 |
| $R_{17} = +13.8889$ | $D_{11} = 0.1250$ | 1.524 | 58.87 | $R_{17}$ 0.8865 |
| $R_{18} = -1.8116$ | $S_7 = 0.0031$ | | | $R_{18}$ 0.9017 |
| $R_{19} = +1.8116$ | $D_{12} = 0.1250$ | 1.524 | 58.87 | $R_{19}$ 0.9157 |
| $R_{20} = -8.3333$ | $S_8 = 0.0031$ | | | $R_{20}$ 0.9102 |
| $R_{21} = +1.0417$ | $D_{13} = 0.1250$ | 1.524 | 58.87 | $R_{21}$ 0.8858 |
| $R_{22} = +3.1250$ | $S_9 = 0.2373$ * | | | $R_{22}$ 0.8602 |
| $R_{23} = -4.0770$ | $D_{14} = 0.2133$ | 1.7283 | 28.66 | $R_{23}$ 0.7560 |
| $R_{24} = +1.0626$ | $S_{10} = 0.3175$ | | | $R_{24}$ 0.6907 |
| $R_{25} = +5.1589$ | $D_{15} = 0.0625$ | 1.7283 | 28.66 | $R_{25}$ 0.7197 |
| $R_{26} = +1.5001$ | $D_{16} = 0.1563$ | 1.61452 | 56.22 | $R_{26}$ 0.7200 |
| $R_{27} = -1.5001$ | | | | $R_{27}$ 0.7225 |

* Aspheric.

| $S_3$ | $S_5$ | $S_6$ | F | log F |
|---|---|---|---|---|
| 0.03023 | 2.54423 | 0.68858 | 1.00000 | 0.00 |
| 1.11409 | 1.40738 | 0.74157 | 1.77827 | 0.25 |
| 1.93430 | 0.60333 | 0.72521 | 3.16227 | 0.50 |
| 2.55076 | 0.16104 | 0.55123 | 5.62339 | 0.75 |
| 2.96233 | 0.16657 | 0.13414 | 10.00000 | 1.00 |

Equation for aspheric surface $R_{23}$ $$X = -4.077 + \sqrt{16.62193 - y^2} - 0.02459203\, y^4 + 0.08899172\, y^6$$
$$- 0.2440590\, y^8 - 0.07442450\, y^{10}$$

The foregoing Example describes a complete thick lens design, with values calculated in many cases to the fourth decimal place, and several additional Examples of this type will be given subsequently.

It is, however, obviously impractical to provide such fully calculated thick lens designs for values broadly distributed throughout the previously specified ranges for all the significant parameters.

However, in order to show the effect of altering the principal parameters within the ranges specified for those parameters, and demonstrate the practicality of designing lenses having parameter values near the extremes of the specified ranges, an illustrative table is given below. The parameters given are all thin lens parameters (parameters of the thin lens construction on which Example I is based) and the effects of these parameter variations are shown on the dimensions of the overall objective and the relative apertures (f-numbers) of the first three members.

In the following table:

$F_B$ is the focal length of the second member;
$F_C$ is the focal length of the third member;
$T_B$ is the total axial movement of the second member;
$T_C$ is the total axial movement of the third member;
R is the minimum value of the ratio of the focal length of the complete objective to its f-number;
L is the overall length from the front of the objective to the focal plane;
D is the maximum diameter at the front of the objective;
$F_{N1}$ is the relative aperture of the first member;
$F_{N2}$ is the relative aperture of the second member; and
$F_{N3}$ is the relative aperture of the third member.

The four critical thin lens parameters set forth in the fifth paragraph of this specification and in the main claim are $F_B$, $F_C$, $T_B$, and $T_C$, and their values for Example I are shown in line 1 of the table. In line 2, $F_B$ is put equal to the lower limit (4R) of the main claim, and in line 3 equal to the upper limit (8R). In lines 4 and 5 $F_C$ is treated similarly. $T_B$ and $T_C$ are dealt with in similar manner in lines 6 and 7 and lines 8 and 9. It is not possible to vary the four parameters completely independently of one another (this is referred to again later), and in fact when one parameter is set to an end limit, at least two of the others have been adjusted, in the table, so that the range of variation of focal length remains approximately unchanged.

Line 3 shows the effect of putting $F_B$ to its upper limit. Conversely, from the changes in L, D, $F_{N1}$, $F_{N2}$ and $F_{N3}$, it can be seen that such a modified thin lens construction would be suitable for development of a final objective of relatively simple construction constructed to cover relatively large image format dimensions (at which scale high complexity would not be permissible) at a smaller relative aperture than Example I.

Lines 4 and 5 show identical effects achievable by putting $F_C$ at its lower and upper limits.

Line 6 shows the effect of putting the total axial movement of the second member at its upper limit. In fact, in order to do this, it is necessary to put at least either $F_B$ or $F_C$ at or near its end limit. This is dictated by the fundamental laws of optics, also bearing in mind the requirement to keep the focal range roughly the same. However, the effect is now not quite the same as in lines 2 to 5, because one axial movement now also lies at its end limit. Thus, the change in L and D from Example I is reduced, while the relative aperture of one member (the third member) is increased but the other two are reduced. Lines 7 to 9 show similar effects; in extent from Example I, as also are $F_{N1}$, $F_{N2}$ and $F_{N3}$. Reverting to line 6 in particular, this modification is suited to a moderately small but not extremely small dimensional scale of final objective having a medium relative aperture, wherein the smaller relative aperture of the third member either permits its complexity to be reduced or, more usefully, its existing complexity utilized to achieve an extremely high standard of aberration correction. Corresponding but slightly different effects can be seen from the modifications of lines 7 to 9.

In general therefore, it can readily be seen from the table how the parameters of the main claim can be taken to their end limits to provide differing effects suited to differing initial requirements. The lens designer given the main claim and having a particular end requirement can work accordingly.

|  | $F_B$ | $F_C$ | $T_B$ | $T_C$ | L | D | $F_{n1}$ | $F_{n2}$ | $F_{n3}$ |
|---|---|---|---|---|---|---|---|---|---|
| Example 1 | −1.47 | −1.82 | 2.93 | 0.66 | 3.62 | 2.81 | 1.59 | 1.0 | 2.29 |
| $F_B$−1.0 (4R) | −1.0 | −1.82 | 2.24 | 0.56 | 2.90 | 2.56 | 1.34 | 0.92 | 2.19 |
| $F_B$−2.0 (8R) | −2.0 | −1.82 | 3.60 | 0.79 | 4.30 | 3.12 | 1.74 | 1.04 | 2.39 |
| $F_C$−1.25 (5R) | −1.47 | −1.25 | 2.44 | 0.58 | 3.11 | 2.69 | 1.40 | 1.00 | 1.67 |
| $F_B$−2.5 (10R) | −1.47 | −2.50 | 3.38 | 0.77 | 4.07 | 2.94 | 1.74 | 0.98 | 3.07 |
| $T_B$2.5 (2.5$F_B$) | −1.0 | −2.36 | 2.50 | 0.66 | 3.18 | 2.62 | 1.44 | 0.91 | 2.78 |
| $T_B$3.0 (1.5$F_B$) | −2.0 | −1.26 | 3.00 | 0.69 | 3.68 | 2.87 | 1.54 | 1.06 | 1.76 |
| $T_C$0.68 (0.27$F_C$) | −1.0 | −2.50 | 2.57 | 0.68 | 3.24 | 2.69 | 1.46 | 0.91 | 2.94 |
| $T_C$0.72 (0.5$F_C$) | −2.0 | −1.44 | 3.22 | 0.72 | 3.91 | 3.00 | 1.63 | 1.05 | 1.97 |

Example I is a zoom lens intended for construction to a medium dimensional scale to cover average format dimensions.

In line 2, the effect of putting $F_B$ to its lower limit is to reduce L and D. $F_{N1}$, $F_{N2}$ and $F_{N3}$ are also reduced, meaning that each individual member has a wider relative aperture. Because of their wider relative apertures, these members would have to be more complex (contain more usable thick lens parameters) than they are in Example I, in order to achieve the same high standard of aberration correction. However, this greater complexity would be acceptable for a zoom objective built to a small dimensional scale covering small image format dimensions. Such a small scale construction would readily be possible in view of the reductions in L and D. Therefore, a zoom lens within the scope of the main claim, with $F_B$ at or near its lower limit, would be preferred for a lens of wider relative aperture but constructed to a smaller dimensional scale than Example I.

The table also demonstrates the sense of the end limits. For example, to take $F_B$ below the value of 1.0(4R) in line 2 would be further to decrease L and D and further widen the relative apertures of the second, third and fourth members. Obviously a question of opinion is involved at this point, but the opinion of the inventor is that the complexity of construction for the second to fourth members, in order to achieve good aberration correction at the further widened relative aperture, would render a practical construction a non-commercial proposition. Likewise to take $F_B$ beyond the value of 2.0(8R) in line 3 would only permit construction of a practical corrected objective to such a large dimensional scale that it would find no useful application. The same factors also arise in the modifications of lines 6 to 9, when coupled with the requirement to maintain a large range of variation of focal length, which is an essential object of the invention.

EXAMPLE II

| Radius | Thickness or air separation | Refractive index $n_d$ | Abbe V number | Clear diameter |
|---|---|---|---|---|
| $R_1 = -7.2114$ | $D_1 = 0.2014$ | 1.7847 | 26.10 | $R_1$ 4.9192 |
| $R_2 = +12.9661$ | $D_2 = 0.8928$ | 1.51507 | 56.35 | $R_2$ 4.9642 |
| $R_3 = -5.8567$ | $S_1 = 0.0045$ | | | $R_3$ 4.9814 |
| $R_4 = +16.2336$ | $D_3 = 0.3661$ | 1.7170 | 47.90 | $R_4$ 4.8164 |
| $R_5 = -22.5012$ | $S_2 = 0.0045$ | | | $R_5$ 4.8014 |
| $R_6 = +5.6034$ | $D_4 = 0.4241$ | 1.7170 | 47.90 | $R_6$ 4.4335 |
| $R_7 = +24.5154$ | $S_3 = $ Variable | | | $R_7$ 4.3867 |
| $R_8 = +3.9647$ | $D_5 = 0.0804$ | 1.69734 | 56.19 | $R_8$ 2.4286 |
| $R_9 = +1.7362$ | $S_4 = 0.5178$ | | | $R_9$ 2.1161 |
| $R_{10} = -3.9138$ | $D_6 = 0.0714$ | 1.69734 | 56.19 | $R_{10}$ 2.1018 |
| $R_{11} = +4.4458$ | $D_7 = 0.3036$ | 1.7847 | 26.10 | $R_{11}$ 2.0132 |
| $R_{12} = -4.4458$ | $D_8 = 0.0714$ | 1.69734 | 56.19 | $R_{12}$ 1.9925 |
| $R_{13} = +8.2572$ | $S_5 = $ Variable | | | $R_{13}$ 1.9161 |
| $R_{14} = -1.8601$ | $D_9 = 0.0536$ | 1.69734 | 56.19 | $R_{14}$ 1.1153 |
| $R_{15} = +1.8601$ | $D_{10} = 0.1518$ | 1.7847 | 26.10 | $R_{15}$ 1.1721 |
| $R_{16} = +14.1274$ | $S_6 = $ Variable | | | $R_{16}$ 1.1857 |
| $R_{17} = -10.0095$ | $D_{11} = 0.1875$ | 1.5168 | 64.20 | $R_{17}$ 1.2552 |
| $R_{18} = -1.9192$ | $S_7 = 0.0045$ | | | $R_{18}$ 1.2861 |
| $R_{19} = +2.6841$ | $D_{12} = 0.1875$ | 1.5168 | 64.20 | $R_{19}$ 1.3110 |
| $R_{20} = -10.8725$ | $S_8 = 0.0045$ | | | $R_{20}$ 1.3033 |
| $R_{21} = +1.3446$ | $D_{13} = 0.1875$ | 1.5168 | 64.20 | $R_{21}$ 1.2672 |
| $R_{22} = +2.9064$ | $S_9 = 0.4375$* | | | $R_{22}$ 1.2220 |
| $R_{23} = -4.2315$ | $D_{14} = 0.3777$ | 1.7283 | 28.66 | $R_{23}$ 1.0500 |
| $R_{24} = +1.9174$ | $S_{10} = 0.4714$ | | | $R_{24}$ 0.9686 |
| $R_{25} = \infty$ | $D_{15} = 0.0929$ | 1.7283 | 28.66 | $R_{25}$ 1.0019 |
| $R_{26} = +2.3366$ | $D_{16} = 0.2304$ | 1.61342 | 59.27 | $R_{26}$ 1.0088 |
| $R_{27} = -2.3366$ | $S_{11} = 0.0045$ | | | $R_{27}$ 1.0186 |
| $R_{28} = +5.7670$ | $D_{17} = 0.2304$ | 1.61342 | 59.27 | $R_{28}$ 1.0068 |
| $R_{29} = -5.7670$ | | | | $R_{29}$ 0.9778 |

*Aspheric.

| $S_3$ | $S_5$ | $S_6$ | F | log F |
|---|---|---|---|---|
| 0.04318 | 3.63462 | 0.98730 | 1.00000 | 0.00 |
| 1.59156 | 2.01054 | 1.06300 | 1.77827 | 0.25 |
| 2.76329 | 0.86219 | 1.03962 | 3.16227 | 0.50 |
| 3.64395 | 0.23005 | 0.79109 | 5.62339 | 0.75 |
| 4.23190 | 0.23796 | 0.19524 | 10.00000 | 1.00 |

Equation for aspheric surface $R_{23}$ $$\underline{X} = -4.2315 + \sqrt{17.90559 - y^2} - 0.01666805\, \underline{y}^4 + 0.02010843\, \underline{y}^6 - 0.00176346\, y^8 - 0.00553820\, y^{10}$$

EXAMPLE III

| Radius | Thickness or air separation | Refractive index $n_d$ | Abbe V number | Clear diameter |
|---|---|---|---|---|
| $R_1 = -7.2114$ | $D_1 = 0.2014$ | 1.7847 | 26.10 | $R_1$ 4.9192 |
| $R_2 = +12.9661$ | $D_2 = 0.8928$ | 1.51507 | 56.35 | $R_2$ 4.9642 |
| $R_3 = -5.8567$ | $S_1 = 0.0045$ | | | $R_3$ 4.9814 |
| $R_4 = +16.2336$ | $D_3 = 0.3661$ | 1.7170 | 47.90 | $R_4$ 4.8164 |
| $R_5 = -22.5012$ | $S_2 = 0.0045$ | | | $R_5$ 4.8014 |
| $R_6 = +5.6034$ | $D_4 = 0.4241$ | 1.7170 | 47.90 | $R_6$ 4.4335 |
| $R_7 = +24.5154$ | $S_3 = $ variable | | | $R_7$ 4.3867 |
| $R_8 = +3.9647$ | $D_5 = 0.0804$ | 1.69734 | 56.19 | $R_8$ 2.4286 |
| $R_9 = +1.7362$ | $S_4 = 0.5178$ | | | $R_9$ 2.1161 |
| $R_{10} = -3.9318$ | $D_6 = 0.0714$ | 1.69734 | 56.19 | $R_{10}$ 2.1018 |
| $R_{11} = +4.4458$ | $D_7 = 0.3036$ | 1.7847 | 26.10 | $R_{11}$ 2.0132 |
| $R_{12} = -4.4458$ | $D_8 = 0.0714$ | 1.69734 | 56.19 | $R_{12}$ 1.9925 |
| $R_{13} = +8.2572$ | $S_5 = $ variable | | | $R_{13}$ 1.9161 |
| $R_{14} = -1.8601$ | $D_9 = 0.0536$ | 1.69734 | 56.19 | $R_{14}$ 1.1153 |
| $R_{15} = +1.8601$ | $D_{10} = 0.1518$ | 1.7847 | 26.10 | $R_{15}$ 1.1721 |
| $R_{16} = +14.1274$ | $S_6 = $ variable | | | $R_{16}$ 1.1857 |
| $R_{17} = \infty$ | $D_{11} = 0.1911$ | 1.524 | 58.87 | $R_{17}$ 1.2830 |
| $R_{18} = -2.3322$ | $S_7 = 0.0045$ | | | $R_{18}$ 1.3098 |
| $R_{19} = +10.6292$ | $D_{12} = 0.1910$ | 1.524 | 58.87 | $R_{19}$ 1.3238 |
| $R_{20} = -10.6292$ | $S_8 = 0.0045$ | | | $R_{20}$ 1.3288 |
| $R_{21} = +2.7812$ | $D_{13} = 0.2678$ | 1.61342 | 59.27 | $R_{21}$ 1.3273 |
| $R_{22} = -2.7812$ | $S_9 = 0.0100$ | | | $R_{22}$ 1.3060 |
| $R_{23} = -2.5142$ | $D_{14} = 0.0893$ | 1.72830 | 28.66 | $R_{23}$ 1.3049 |
| $R_{24} = \infty$ | $S_{10} = 1.8928$ | | | $R_{23}$ 1.2833 |
| $R_{25} = \infty$ | $D_{15} = 0.0893$ | 1.72830 | 28.66 | $R_{25}$ 0.9600 |
| $R_{26} = +1.4266$ | $S_{11} = 0.0298$ | | | $R_{26}$ 0.9600 |
| $R_{27} = +1.6477$ | $D_{16} = 0.2929$ | 1.69734 | 56.19 | $R_{27}$ 0.9600 |
| $R_{28} = -2.7352$ | | | | $R_{28}$ 0.9600 |

| $S_3$ | $S_5$ | $S_6$ | F | log F |
|---|---|---|---|---|
| 0.04318 | 3.63462 | 1.0319 | 1.00000 | 0.00 |
| 1.59156 | 2.01054 | 1.1076 | 1.77827 | 0.25 |
| 2.76329 | 0.86219 | 1.08422 | 3.16227 | 0.50 |
| 3.64395 | 0.23005 | 0.83569 | 5.62339 | 0.75 |
| 4.23190 | 0.23796 | 0.23984 | 10.00000 | 1.00 |

EXAMPLE IV

| Radius | Thickness or air separation | Refractive index $n_d$ | Abbe V number | Clear diameter |
|---|---|---|---|---|
| $R_1 = -12.6240$ | $D_1 = 0.3526$ | 1.7847 | 26.10 | $R_1$ 8.6115 |
| $R_2 = +22.6983$ | $D_2 = 1.5630$ | 1.51507 | 56.35 | $R_2$ 8.6903 |
| $R_3 = -10.2525$ | $S_1 = 0.0078$ | | | $R_3$ 8.7203 |
| $R_4 = +28.4181$ | $D_3 = 0.6409$ | 1.7170 | 47.90 | $R_4$ 8.4314 |
| $R_5 = -29.3901$ | $S_2 = 0.0078$ | | | $R_5$ 8.4052 |
| $R_6 = +9.8091$ | $D_4 = 0.7425$ | 1.7170 | 47.90 | $R_6$ 7.7612 |
| $R_7 = +42.9160$ | $S_3 = $ Variable | | | $R_7$ 7.6792 |
| $R_8 = +6.9388$ | $D_5 = 0.1407$ | 1.69681 | 56.33 | $R_8$ 4.2516 |
| $R_9 = +3.0368$ | $S_4 = 0.9066$ | | | $R_9$ 3.7045 |
| $R_{10} = -6.8699$ | $D_6 = 0.1250$ | 1.69681 | 56.33 | $R_{10}$ 3.6795 |
| $R_{11} = +7.8124$ | $D_7 = 0.5314$ | 1.78503 | 26.09 | $R_{11}$ 3.5240 |
| $R_{12} = -7.8124$ | $D_8 = 0.1250$ | 1.69681 | 56.33 | $R_{12}$ 3.4870 |
| $R_{13} = +14.3312$ | $S_5 = $ Variable | | | $R_{13}$ 3.3528 |
| $R_{14} = -3.2586$ | $D_9 = 0.0938$ | 1.69681 | 56.33 | $R_{14}$ 1.9539 |
| $R_{15} = +3.2586$ | $D_{10} = 0.2657$ | 1.78503 | 26.09 | $R_{15}$ 2.0536 |
| $R_{16} = +24.3322$ | $S_6 = $ Variable | | | $R_{16}$ 2.0774 |
| $R_{17} = -12.5098$ | $D_{11} = 0.3345$ | 1.65031 | 58.60 | $R_{17}$ 2.2274 |
| $R_{18} = -3.7028$ | $S_7 = 0.0078$ | | | $R_{18}$ 2.2899 |
| $R_{19} = +10.5352$ | $D_{12} = 0.3345$ | 1.65031 | 58.60 | $R_{19}$ 2.3212 |
| $R_{20} = -10.5352$ | $S_8 = 0.0078$ | | | $R_{20}$ 2.3181 |
| $R_{21} = +4.8649$ | $D_{13} = 0.4689$ | 1.61317 | 59.27 | $R_{21}$ 2.2837 |
| $R_{22} = -4.8649$ | $S_9 = 0.0258$ | | | $R_{22}$ 2.2259 |
| $R_{23} = -4.1260$ | $D_{14} = 0.1563$ | 1.7282 | 28.66 | $R_{23}$ 2.2243 |
| $R_{24} = +27.3461$ | $S_{10} = 2.8136$ | | | $R_{24}$ 2.1602 |
| $R_{25} = \infty$ | $D_{15} = 0.1563$ | 1.76128 | 26.98 | $R_{25}$ 1.7178 |
| $R_{26} = +1.8127$ | $S_{11} = 0.0119$ | | | $R_{26}$ 1.7350 |
| $R_{27} = +1.8913$ | $D_{16} = 0.5643$ | 1.65031 | 58.60 | $R_{27}$ 1.7382 |
| $R_{28} = -3.5367$ | $S_{12} = 0.0078$* | | | $R_{28}$ 1.7741 |
| $R_{29} = +3.9463$ | $D_{17} = 0.2880$ | 1.65031 | 58.60 | $R_{29}$ 1.7554 |
| $R_{30} = \infty$ | | | | $R_{30}$ 1.7100 |

* Aspheric.

| $S_1$ | $S_3$ | $S_5$ | F | log F |
|---|---|---|---|---|
| 0.08428 | 6.36327 | 1.80704 | 1.00000 | 0.0 |
| 2.79513 | 3.51989 | 1.93956 | 1.77827 | 0.25 |
| 4.84654 | 1.50941 | 1.89864 | 3.16227 | 0.5 |
| 6.38837 | 0.40269 | 1.46352 | 5.62339 | 0.75 |
| 7.41774 | 0.41652 | 0.42032 | 10.00000 | 1.0 |

Equation for aspheric surface $R_{29}$ $$\underline{x} = + 3.9463 - \sqrt{15.57328 - y^2} + 0.00427020\ \underline{y}^6 - 0.00777096\ \underline{y}^8 + 0.00721693\ \underline{y}^{10}$$

In all these examples, the maximum value $F_m$ of the equivalent focal length F of the objective is ten times the minimum value $F_o$ thereof. Example I is corrected for a relative aperture $f/4.0$, whilst Examples II and III are each corrected for a relative aperture $f/2.8$, and Example IV is corrected for a relative aperture of $f/1.6$. Examples II and III differ from one another solely in the stationary rear member $L_D$, the front three members $L_A$, $L_B$ and $L_C$ being identical in the two examples. Such members $L_A$, $L_B$ and $L_C$ are in fact similar to the front three members $L_A$, $L_B$ and $L_C$ of Example I, the dimensions being scaled up from those of Example I in the ratio of the $f$-numbers, that is in the ratio of $4.0/2.8$. The rear members $L_D$ in Examples II and III are, however, not scaled-up versions of the rear member $L_D$ of Example I. The front three members $L_A$, $L_B$, $L_C$ of Example IV, which includes yet another alternative construction of rear member $L_D$, are of the same general type as those of Examples I-III, but their numerical dimensions differ somewhat from a version of those of Example I scaled up in the ratio $4.0/1.6$.

All these examples cover a semi-angular field of view varying from 27 degrees at $F_o$ to 2.7 degrees at $F_m$.

The iris diaphragm in all four examples is stationary and is located between the movable third member $L_C$ and the stationary rear member $L_D$. In Example I the diaphragm is $0.0625\ F_o$ in front of the surface $R_{17}$ and has diameter $0.8568\ F_o$; in Example II the diaphragm is $0.0929\ F_o$ in front of the surface $R_{17}$ and has diameter $1.2240\ F_o$; in Example III the diaphragm is $0.1375\ F_o$ in front of the surface $R_{17}$ and has diameter $1.2240\ F_o$; and in Example IV the diaphragm is $0.2407\ F_o$ in front of the surface $R_{17}$ and has diameter $2.1446\ F_o$.

The back focal distance from the rear surface of the objective to the image plane is $2.8301\ F_o$ in Example I, $2.6761\ F_o$ in Example II, $2.3027\ F_o$ in Example III and $1.7878\ F_o$ in Example IV.

The equivalent focal length $f_A$ of the stationary first member $L_A$ is $+ 4.4551\ F_o$ in Example I, $+ 6.3644\ F_o$ in Examples II and III and $+ 11.1415\ F_o$ in Example IV; the equivalent focal length $f_B$ of the movable second member $L_B$ is $- 1.4703\ F_o$ in Example I, $- 2.1004\ F_o$ in Examples II and III and $- 3.6770\ F_o$ in Example IV; the equivalent focal length $f_C$ of the movable third member $L_C$ is $- 1.8176\ F_o$ in Example I, $- 2.5966\ F_o$ in Examples II and III and $- 4.5458\ F_o$ in Example IV; and the equivalent focal length $f_D$ of the stationary fourth member $L_D$ is $+ 1.4753\ F_o$ in Example I, $+ 2.1286\ F_o$ in Example II, $+ 2.3232\ F_o$ in Example III and $+ 4.0419\ F_o$ in Example IV; the positive and negative signs respectively indicating convergence and divergence.

In all four examples, the convergent stationary front member $L_A$ consists of a meniscus doublet component followed by two convergent simple components. The front surface $R_1$ of the doublet component is concave to the front and has dispersive optical power numerically equal to $0.155/F_o$ or $0.692/f_A$ in Example I, to $0.109/F_o$ or $0.692/f_A$ in Examples II and III, and to $0.062/F_o$ or $0.692/f_A$ in Example IV. The internal contact $R_2$ of the doublet component is dispersive and convex to the front and has radius of curvature equal to $2.037\ f_A$ in all four examples. The difference between the mean refractive indices of the materials of the two elements of such doublet component is 0.27 in all four examples.

The combined equivalent focal length of the two simple components of the first member $L_A$ is $4.0013\ F_o$ in Example I, $5.7162\ F_o$ in Examples II and III, and $10.0064\ F_o$ in Example IV or $0.8981\ f_A$ in all four examples. The radius of curvature $R_4$ of the front surface of the first of such simple components is $2.551\ f_A$ in all four examples, and the radius of curvature $R_6$ of the front surface of the second of such simple components is $0.880\ f_A$ in all four examples. The rear surface $R_7$ of such second simple component is convex to the front with radius of curvature $3.852\ f_A$ in all four examples.

The axial thickness $(D_1 + D_2)$ of the meniscus doublet component of the first member $L_A$ is $0.766\ F_o$ in Example I, $1.094\ F_o$ in Examples II and III, and $1.916\ F_o$ in Example IV, or $0.172\ f_A$ in all four examples. The sum of the axial thicknesses of the two simple components $(D_3 + D_4)$ of the first member is $0.553\ F_o$ in Example I, $0.790\ F_o$ in Examples II and III, and $1.383\ F_o$ in Example IV, or $0.124\ f_A$ in all four examples.

The arithmetic mean between the Abbe V numbers of the materials of the three convergent elements of the first member $L_A$ in all four examples is 50.72 and thus exceeds the Abbe V number of the material of the divergent front element by 24.62.

The maximum value of the ratio of the equivalent focal length of the objective to the $f$-number of the objective is $2.5\ F_o$ in Example I, $3.57\ F_o$ in Examples II and III, and $6.25\ F_o$ in Example IV, so that in all four examples $f_A$ is 1.782 times such maximum value.

In all four examples, the minimum separation between the movable second and third members $L_B$ and $L_C$ occurs when the equivalent focal length of the objective is $7.45\ F_o$, and the numerical values of the equivalent focal lengths $f_B$ and $f_C$ of such members are respectively 5.88 and 7.27 times the minimum value of the ratio of the equivalent focal length of the objective to the $f$-number of the objective.

The movable second member $L_B$ in all four examples consists of a divergent simple meniscus component with its surfaces convex to the front followed by a divergent triplet component having a convergent element between two divergent elements, and its total axial movement (a unidirectional rearward movement) in the range of variation is numerically equal to $1.994\ f_B$. The front and rear surfaces $R_8$ and $R_9$ of the simple meniscus component of such member respectively have radii of curvature numerically equal to $1.89\ f_B$ and $0.83\ f_B$ in all four examples, whilst the front and rear surfaces $R_{10}$ and $R_{13}$ of the triplet component respectively have radii of curvature numerically equal to $1.86\ f_B$ in Examples I - III and $1.87\ f_B$ in Example IV and to $3.93\ f_B$ in Examples I-III and $3.99\ f_B$ in Example IV.

The movable third member $L_C$ in all four examples consists of a doublet component, whose front surface $R_{14}$ is concave to the front with radius of curvature numerically equal to $0.72\ f_C$, and the total axial movement (the numerical sum of an initial forward movement plus a subsequent rearward movement) of such member is numerically equal to 0.363 $f_C$. The internal contact $R_{15}$ of such doublet component is collective and convex to the front, with radius of curvature numerically equal to 0.72 $f_C$. The difference between the mean refractive indices of the materials of such doublet component is 0.087 in Examples I - III and 0.088 in Example IV, the difference between their Abbe V numbers being 30.09 in Examples I - III and 30.24 in Example IV.

In all four examples, the various aberrations are well stabilized in the front three members $L_A$, $L_B$, $L_C$ throughout the range of variation of equivalent focal length of the objective and also throughout the focussing range, and the stationary rear member $L_D$ serves to balance out such residual stabilized aberrations, and also to locate the resultant image plane in a convenient position. The construction of such rear member may thus vary widely.

In Examples I and II, such rear member may be described as of modified Cooke triplet construction, wherein the strong convergent power needed at the front to deal with the relatively widely divergent beam received from the third member is achieved by the use of three simple convergent components, which are followed by a simple divergent component and either a convergent doublet component as in Example I or a convergent doublet component followed by a convergent simple component as in Example II. In these two examples an aspheric surface is used in order to assist in balancing out the residual stabilized aberrations of the front three members without undue increase in the overall length of the objective, such aspheric surface being the front surface $R_{23}$ of the simple divergent component, where it can be employed for the simultaneous correction of spherical aberration and coma with minimum effect on oblique aberrations.

In Example III, a somewhat different type of stationary rear member is used, which may be described as of modified Petzval construction. In this case, six simple components are used, the first three again being convergent in order to give the necessary strong convergent power at the front, whilst the next two are divergent and the sixth is convergent. Although no aspheric surface is used in the actual example given, some further improvement in aberration correction could be achieved by incorporating such a surface.

Yet another alternative construction for the stationary rear member $L_D$ is employed in Example IV, consisting of seven simple components, the first three and the last two being convergent, and the fourth and fifth divergent. An aspheric surface is again used, in this case the front surface $R_{29}$ of the rearmost component.

It is often desired in practice to provide two different ranges of variation of the equivalent focal length of the objective, and with the objective according to the present invention this can be carried out in a simple way by the provision of an achromatic doublet component, which can be placed at will behind the stationary rear member $L_D$ of the objective, such doublet component, when in position, acting to move the resultant image plane further from the rear surface of the member $L_D$ and to increase the values of the equivalent focal length of the objective in the same proportion throughout the range. Another effect of the addition of this doublet component is to reduce the relative aperture of the objective and the angular field covered. Numerical data are given below of two alternative examples of achromatic doublet component suited to follow the rear member $L_D$ of Example I above. FIGS. 5 and 6 respectively show these two examples of doublet component $L_E$ in position behind the main objective, which for simplicity is shown only in skeleton form, the front and rear surfaces only being shown for each of the four members $L_A$, $L_B$, $L_C$ and $L_D$ of the objective.

EXAMPLE V

| Radius | Thickness or air separation | Refractive index $n_d$ | Abbe V number | Clear diameter |
|---|---|---|---|---|
| $R_{28} = \infty$ | $S_{11} = 0.2812$ | | | $R_{28}$ 0.7312 |
| $R_{29} = -2.0920$ | $D_{17} = 0.0781$ | 1.70035 | 30.28 | $R_{29}$ 0.7312 |
| $R_{30} = +3.3428$ | $D_{18} = 0.0500$ | 1.60483 | 43.83 | $R_{30}$ 0.7312 |

EXAMPLE VI

| Radius | Thickness or air separation | Refractive index $n_d$ | Abbe V number | Clear diameter |
|---|---|---|---|---|
| $R_{28} = \infty$ | $S_{11} = 0.7369$ | | | $R_{28}$ 0.6749 |
| $R_{29} = -2.0920$ | $D_{17} = 0.0781$ | 1.70035 | 30.28 | $R_{29}$ 0.6749 |
| $R_{30} = +2.0920$ | $D_{18} = 0.0500$ | 1.60982 | 53.31 | $R_{30}$ 0.6749 |

The dimensions in these two examples of achromatic doublet component are given in terms of the minimum value $F_o$ of the equivalent focal length for the objective of Example I. In each table $S_{11}$ represents the air separation between the rear surface $R_{27}$ of the stationary rear member $L_D$ of Example I and the front surface $R_{28}$ of the added doublet component. The doublet component in each case consists of a convergent element in front of a divergent element.

The added doublet component $L_E$ of Example V increases the values of the equivalent focal length in the ratio 3:2, so that the normal range from $F_o$ to 10 $F_o$ is altered by the doublet component into a range from 1.5 $F_o$ to f/$F_o$. The doublet component of Example VI acts to double the values of the equivalent focal length of Example I, thus giving a range from 2 $F_o$ to 20 $F_o$ when the doublet component is in position.

The back focal distance from the rear surface $R_{30}$ of the added doublet component $L_E$ to the new position of the resultant image plane is 3.704 $F_o$ in Example V and 4.028 $F_o$ in Example VI. The relative aperture of the objective is changed from $f4.0$ by the addition of the doublet component to $f/6.0$ in Example V and $f/8.0$ in Example VI. The semi-angular field, which for Example I alone varies from 27 degrees at $F_o$ to 2.7 degrees at $F_m$, varies (when the doublet component of Example V is added) from 18 degrees at 1.5 $F_o$ to 1.8 degrees at 15 $F_o$, and (when the doublet component of Example VI is added) from 13.5 degrees at 2 $F_o$ to 1.35 degrees at 20 $F_o$.

It will be realized that the addition of only an achromatic doublet component to an already well-corrected objective must necessarily result in a lower standard of aberration correction when the doublet component is in place. But the increased equivalent focal length and reduced relative aperture and angular field do not call for so high a standard of correction as is needed when the objective is used alone, and for many practical purposes the standard of correction obtained with the doublet component added is adequate.

The necessary axial movement of the second and third members may be brought about in various ways, for example by means of two appropriately shaped cams, which may be in the form of cam grooves B and E on the inner surface of a tubular member C rotated by the zoom control element G and surrounding the second and third members M and H, which are held against rotation relatively to the fixed casing F of the objective. The focussing movement of the front member P may be effected under the control of a focussing control element O by mounting the front member in screw threaded engagement with the fixed casing F of the objective.

It will be appreciated that the foregoing examples have been given by way of example only and that the invention can be carried into practice in other ways.

We claim

1. An optical objective of the zoom type (that is of the type having relatively movable members whereby the equivalent focal length of the objective can be continuously varied throughout a range, whilst maintaining constant position of the image plane), corrected for spherical and chromatic aberrations, coma, astigmatism, field curvature and distortion, said objective having a maximum equivalent focal length at least 6 times its minimum focal length, and comprising a convergent first member which for a given object distance remains stationary during the zooming relative movements, an axially movable divergent second member behind the first member having equivalent focal length $f_B$ lying numerically between 4 and 8 times the minimum value of the ratio of the equivalent focal length of the complete objective to the $f$-number of the objective in the range of variation, an axially movable divergent third member behind the second member having equivalent focal length $f_C$ lying numerically between 5 and 10 times the minimum value of such ratio, a stationary convergent fourth member behind the third member, a zoom control element, and means whereby operation of the zoom control element causes the zooming relative movements to be effected, wherein the total axial movement of the second member in the range of variation lies numerically between $1.5f_B$ and $2.5f_B$ and the total axial movement of the third member in the range lies numerically between $0.25f_C$ and $0.5f_C$, the minimum axial separation between the second and third member occurring when the equivalent focal length of the objective is greater than half its maximum value in the range of variation, the movable divergent second member consisting of a divergent simple meniscus component with its surfaces convex to the front and a divergent compound component behind such simple component, and the movable divergent third member consisting of a doublet component having its front surface concave to the front.

2. An optical objective as claimed in claim 1, in which the compound component in the divergent movable second member includes at least one convergent element and at least one divergent element made of materials of differing Abbe V numbers.

3. An optical objective as claimed in claim 2, in which the front surface of the compound component of the second member is concave to the front and the rear surface of such component is convex to the front.

4. An optical objective as claimed in claim 3, in which the compound component of the second member consists of a triplet component having a convergent element between two divergent elements.

5. An optical objective as claimed in claim 4, in which the doublet component constituting the third member has a collective internal contact convex to the front.

6. An optical objective as claimed in claim 2, in which the front surface of the compound component of the second member is concave to the front and the rear surface of such component is convex to the front.

7. An optical objective as claimed in claim 2, in which the doublet component constituting the third member has a collective internal contact convex to the front, and the materials of the two elements of such component having differing Abbe V numbers and differing mean refractive indices.

8. An optical objective as claimed in claim 1, in which the front surface of the compound component of the second member is concave to the front and the rear surface of such component is convex to the front.

9. An optical objective as claimed in claim 8, in which the compound component of the second member consists of a triplet component having a convergent element between two divergent elements, the materials of all the elements of the second member having mean refractive indices greater than 1.69 and being such that the arithmetic mean between the Abbe V numbers of the materials of the divergent elements exceeds that of the convergent element.

10. An optical objective as claimed in claim 9, including an achromatic doublet which can be placed at will behind the stationary rear member of the objective and acts when in its operative position to increase the values of the equivalent focal length of the objective by a chosen ratio throughout the range of variation.

11. An optical objective as claimed in claim 1, in which the compound component of the second member consists of a triplet component having a convergent element between two divergent elements.

12. An optical objective as claimed in claim 11, in which the doublet component constituting the third member has a collective internal contact convex to the front with radius of curvature substantially equal to $0.72f_C$, the materials of the two elements of such component having Abbe V numbers which differ by about 30 and mean refractive indices which are each greater than 1.69 and differ by about 0.09.

13. An optical objective as claimed in claim 1, in which the doublet component constituting the divergent movable third member has a collective internal contact convex to the front with radius of curvature substantially equal to $0.72f_C$, the difference between the mean refractive indices of the materials of the two elements of such component being about 0.09, while the difference between the Abbe V numbers of such materials is about 30.

14. An optical objective as claimed in claim 13, including an achromatic doublet which can be placed at will behind the stationary rear member of the objective and acts when in its operative position to increase the values of the equivalent focal length of the objective by a chosen ratio throughout the range of variation.

15. An optical objective of the zoom type (that is of the type having relatively movable members whereby the equivalent focal length of the objective can be continuously varied throughout a range, whilst maintaining constant position of the image plane), corrected for spherical and chromatic aberrations, coma, astigmatism, field curvature and distortion, and comprising a convergent first member which for a given object distance remains stationary during the zooming relative movements, an axially movable divergent second member behind the first member having equivalent focal length $f_B$ lying numerically between 4 and 8 times the minimum value of the ratio of the equivalent focal length of the complete objective to the $f$-number of the objective in the range of variation, an axially movable divergent third member behind the second member having equivalent focal length $f_C$ lying numerically between 5 and 10 times the minimum value of such ratio, a stationary convergent fourth member behind the third member, a zoom control element, and means whereby operation of the zoom control causes the zooming relative movements to be effected, wherein the total axial movement of the second member in the range of variation lies numerically between $1.5f_B$ and $2.5f_B$ and the total axial movement of the third member in the range lies numerically between $0.25f_C$ and $0.5f_C$, the minimum axial separation between the second and third members occurring when the equivalent focal length of the objective is greater than half its maximum value in the range of variation, the movable divergent second member consisting of a divergent simple meniscus component with its surfaces convex to the front and a divergent compound component behind such simple component, the movable divergent third member consisting of a doublet component having its front surface concave to the front, and the first member of the objective comprises a meniscus doublet component having a front surface which is concave to the front and two simple convergent components behind such meniscus doublet component.

16. An optical objective as claimed in claim 15, in which the internal contact of the meniscus doublet component of the first member is dispersive and convex to the front.

17. An optical objective as claimed in claim 16, in which the compound component in the divergent movable second member includes at least one convergent element and at least one divergent element, and the doublet component constituting the third member has a collective internal contact convex to the front.

18. An optical objective as claimed in claim 15, in which the two simple components of the first member together have their front surfaces convex to the front, the radius of curvature of the front surface of the first of such simple components being greater than twice the radius of curvature of the front surface of the second of such simple components, the rear surface of the second of the two simple components being convex to the front.

19. An optical objective as claimed in claim 15, in which the axial thickness of the meniscus doublet component of the first member is is greater than the sum of the axial thicknesses of the two simple components of the first member.

20. An optical objective as claimed in claim 19, including an achromatic doublet which can be placed at will behind the stationary rear member of the objective and acts when in its operative position to increase the values of the equivalent focal length of the objective by a chosen ratio throughout the range of variation.

21. An optical objective as claimed in claim 15, including an achromatic doublet which can be placed at will behind the stationary rear member of the objective and acts when in its operative position to increase the values of the equivalent focal length of the objective by a chosen ratio throughout the range of variation.

22. An optical objective as claimed in claim 21, in which the internal contact of the meniscus doublet component of the first member is dispersive and convex to the front with radius of curvature substantially equal to $2.04f_A$, the difference between the mean refractive indices of the materials of the two elements of the doublet being substantially 0.27.

* * * * *

UNITED STATES PATENT OFFICE
CERTIFICATE OF CORRECTION

Patent No. 3,736,048　　　　　　　　Dated May 29, 1973

Inventor(s) GORDON HENRY COOK and PETER ARNOLD MERIGOLD

It is certified that error appears in the above-identified patent and that said Letters Patent are hereby corrected as shown below:

[73]　Assignee:　The Rank Organisation Limited
　　　　　　　　　London, England

[30]　　　　　Foreign Application Priority Data
　　Sept. 14, 1962　　Great Britain..........35088

Signed and sealed this 27th day of November 1973.

(SEAL)
Attest:

EDWARD M. FLETCHER, JR.　　　　　RENE D. TEGTMEYER
Attesting Officer　　　　　　　　Acting Commissioner of Patents